(12) United States Patent
Colson (10) Patent No.: US 6,490,804 B1
(45) Date of Patent: Dec. 10, 2002

(54) COMPARISON GAUGE FOR AUTOMOTIVE STARTERS

(76) Inventor: Fred T. Colson, 2233 Bascom Way, Clearwater, FL (US) 33764

( * ) Notice: Subject to any disclaimer, the term of this patent is extended or adjusted under 35 U.S.C. 154(b) by 0 days.

(21) Appl. No.: 09/580,925

(22) Filed: May 26, 2000

Related U.S. Application Data (60) Provisional application No. 60/136,356, filed on May 28, 1999.

(51) Int. Cl.[7] ................................................. G01B 3/00
(52) U.S. Cl. ............................. 33/542; 33/600; 33/833
(58) Field of Search ......................... 33/542, 501.05, 33/600, 613, 645, 655, 656, 548, 549, 555, 832, 833

(56) References Cited

U.S. PATENT DOCUMENTS

| | | | | |
|---|---|---|---|---|
| 2,924,020 A | * | 2/1960 | Billeter | 33/613 |
| 3,049,807 A | * | 8/1962 | Smeets | 33/613 |
| 3,802,084 A | * | 4/1974 | Fortado, Jr. | 33/613 |
| 3,835,544 A | * | 9/1974 | Schneider | 33/143 J |
| 3,903,737 A | * | 9/1975 | Burden et al. | 73/118 |
| 3,906,639 A | * | 9/1975 | Wilamowski | 33/191 |
| 4,362,065 A | * | 12/1982 | Baratti | 74/7 A |
| 4,388,759 A | * | 6/1983 | Orejola | 33/1 C |
| 4,416,063 A | * | 11/1983 | Nestor et al. | 33/163 |
| 4,419,830 A | * | 12/1983 | Miller | 33/178 R |
| 4,505,045 A | * | 3/1985 | Stocker | 33/181 AT |
| 4,507,870 A | * | 4/1985 | Meyer, Jr. | 33/178 R |
| 4,665,320 A | * | 5/1987 | DeBello | 290/48 |
| 4,730,399 A | * | 3/1988 | Campbell | 33/600 |
| 4,974,463 A | * | 12/1990 | Luiki | 74/7 A |
| 5,454,175 A | * | 10/1995 | Li | 33/797 |
| 5,533,274 A | * | 7/1996 | Westling | 33/600 |
| 6,170,983 B1 | * | 1/2001 | Germanow | 374/1 |

* cited by examiner

Primary Examiner—Diego Gutierrez
Assistant Examiner—Gail Verbitsky (57) ABSTRACT

A hand held integral gauge for comparing automotive starters so that a replacement starter will accurately match the starter being replaced, to avoid poor engagement and premature failure of flywheels and starters. The gauge is compact, easy to use and manufacture, and consists of only three main parts. The gauge is mounted on the starter to be replaced to get initial measurement (in ten thousandths). The gauge is then mounted in the same way on the replacement starter to compare, thus determining an accurate fit.

3 Claims, 8 Drawing Sheets

COMPARISON GAUGE FOR AUTOMOTIVE STARTERS

CROSS-REFERENCE TO RELATED APPLICATIONS

This application claims priority to U.S. Provisional Application Ser. No. 60/136,356, filed May 28, 1999, by Fred T. Colson, entitled "Comparison Gauge for Automotive Starters".

BACKGROUND OF THE INVENTION

1. Field of the Invention

The present invention relates to accurately selecting replacement starters to prevent poor engagement and premature failures of starters and flywheels.

2. Description of Prior Art

Westling (U.S. Pat. No. 5,533,274) shows a gauge for attachment to internal combustion engines for determining proper positioning and selection of starter motor housings for an individual engine.

The gauge of the present invention is mounted on a starter motor and can be used at the source of the replacement starter, such as an automobile parts store, used parts dealer, or remanufacturing facility.

SUMMARY OF THE INVENTION

The gauge is used to discriminate between two like starters as measured by a calibrated indicator to prevent poor engagement and premature failure of flywheels and starters.

By measuring from the shaft and the flange mount of the starter, the gauge indicates in ten thousandths the distance between the top of the flange and the top of the armature shaft, thus making it possible to compare this distance with like starters.

It is an object of the invention to provide a gauge which can be used to make sure a rebuilt starter will fit the same as a properly fit old starter.

The gauge permits matching a starter housing of a core (an old starter off a car) to the housing on a replacement starter.

DETAILED DESCRIPTION OF THE PREFERRED EMBODIMENTS

Figure 1:
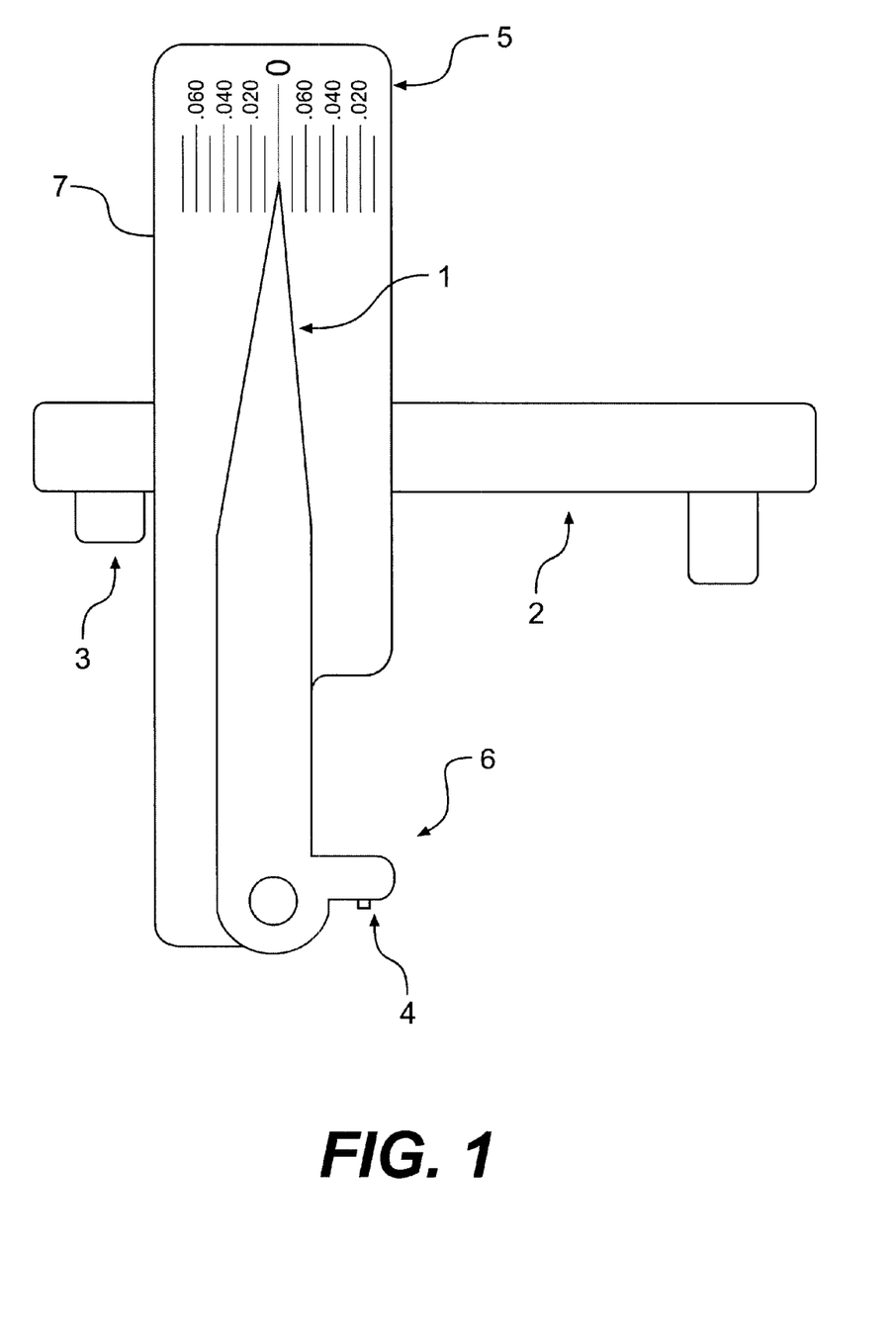
FIG. 1 is a top plan view of the gauge of the present invention.

Referring to FIG. 1, the integral gauge comprises three basic parts, namely a side plate 7, an alignment plate 2 and an indicator 1. The side plate has a scale thereon, with ten thousandth increments. The alignment plate has alignment pins 3 extending downwardly therefrom. Pointed indicator 1 has a calibration set screw 4 in the indicator foot 6.

Figure 2:
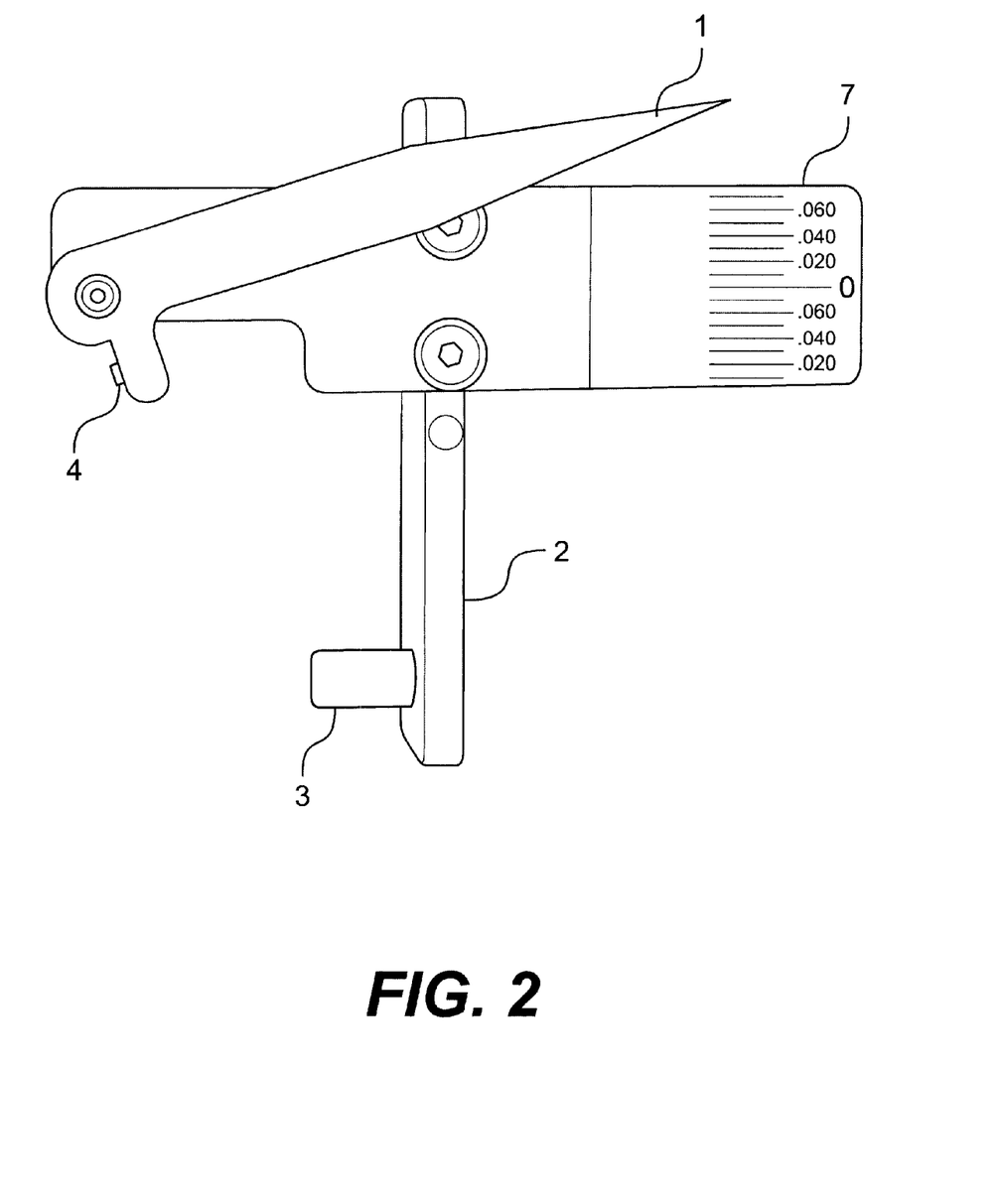
FIG. 2 is a perspective view of the gauge of the present invention.

Referring to FIG. 2, the alignment plate 2 extends perpendicular to the side plate 7 and the long axis of pins 3 is parallel to the long axis of side plate 7. The longitudinal axis of the set screw 4 is parallel to the longitudinal axis of pointed indicator 1.

Figure 3:
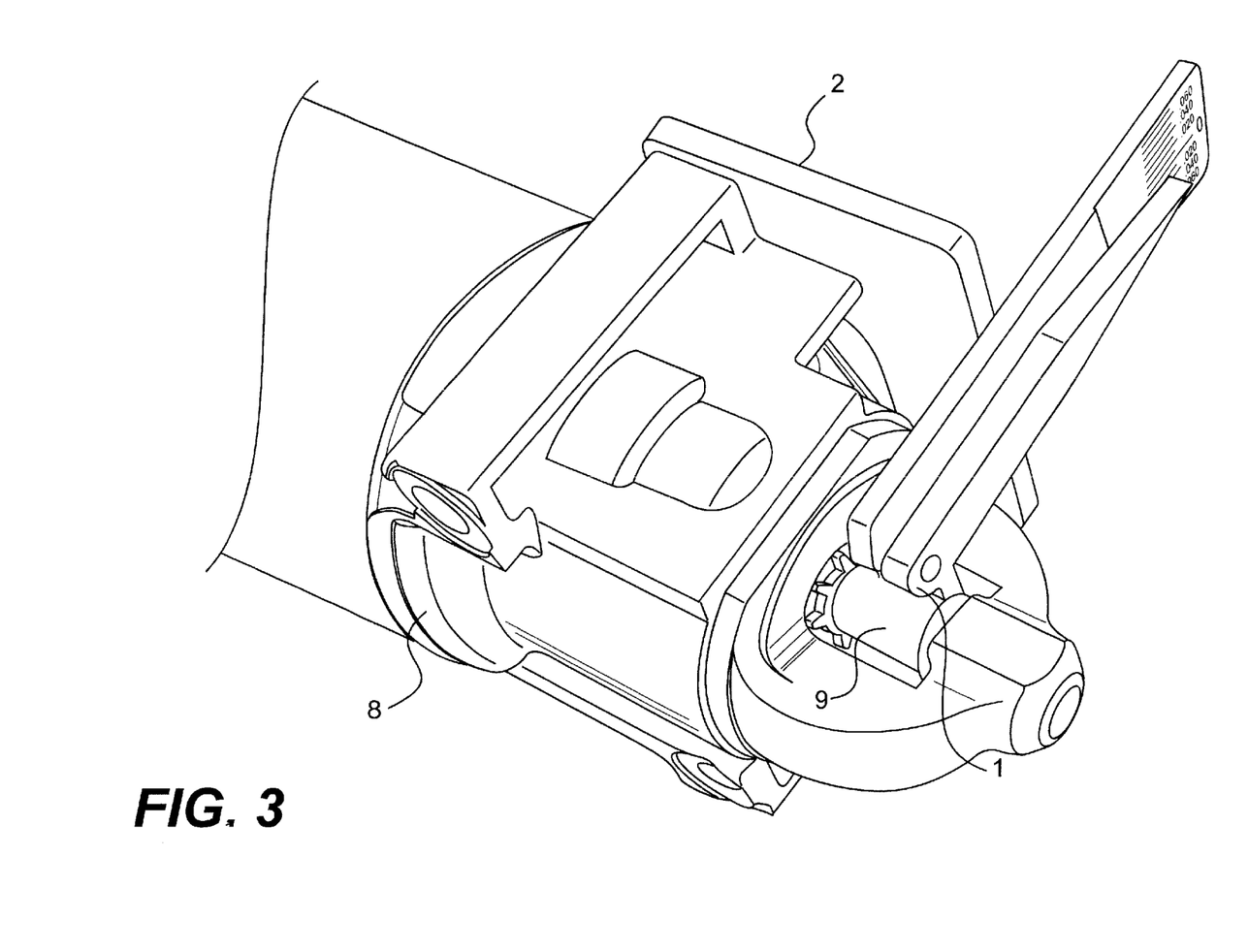
FIG. 3 is a perspective view of the gauge mounted on a drive end housing with the starter apart for rebuilding.

Referring to FIG. 3, the gauge is mounted on drive end housing 8 by means of alignment plate 2. The set screw (not visible) in the foot of pointed indicator 1 is contacting the top of armature shaft 9.

Figure 4:
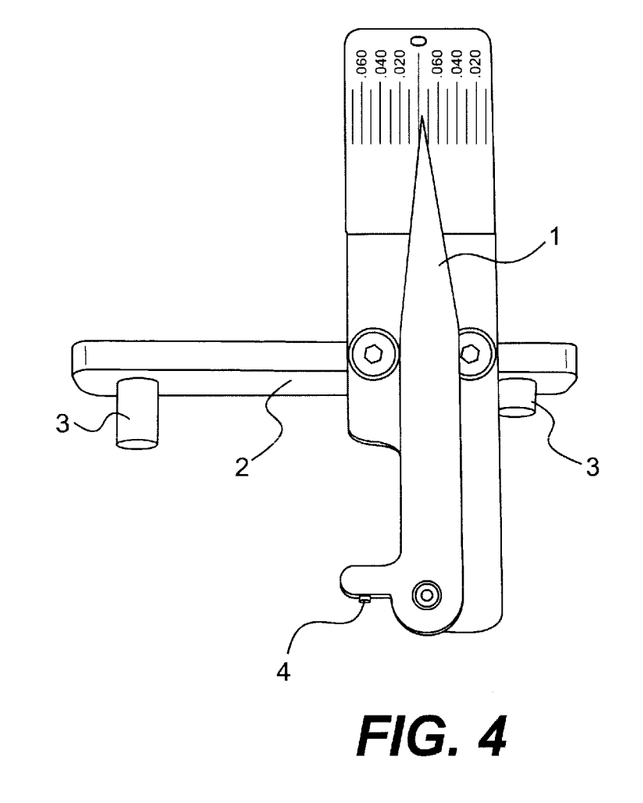
FIG. 4 is a perspective view of a right hand version of the gauge.

Referring to FIG. 4, in a right hand version of the gauge, the left most pin (3) is about twice as long as the right most pin.

Figure 5:
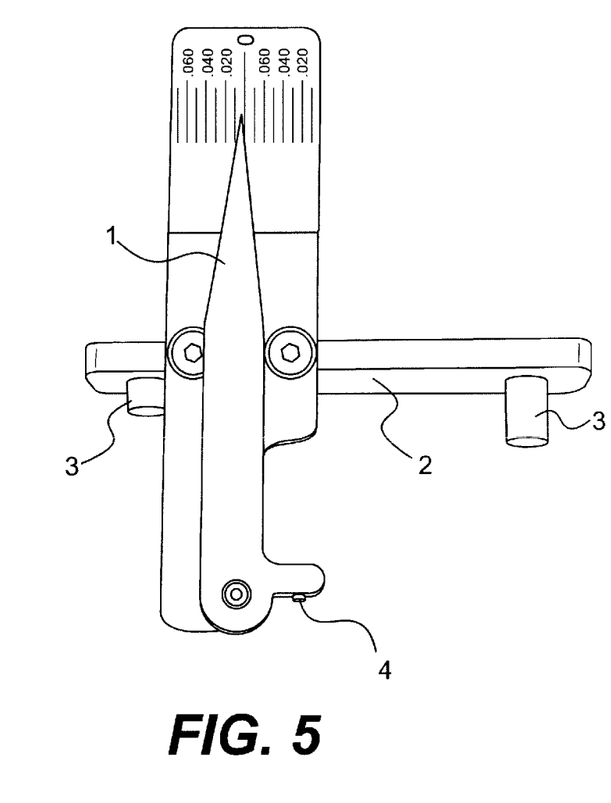
FIG. 5 is a perspective view of a left hand version of the gauge.

Referring to FIG. 5, in a left hand version, the right most pin is about twice as long as the left most pin.

Figure 6:
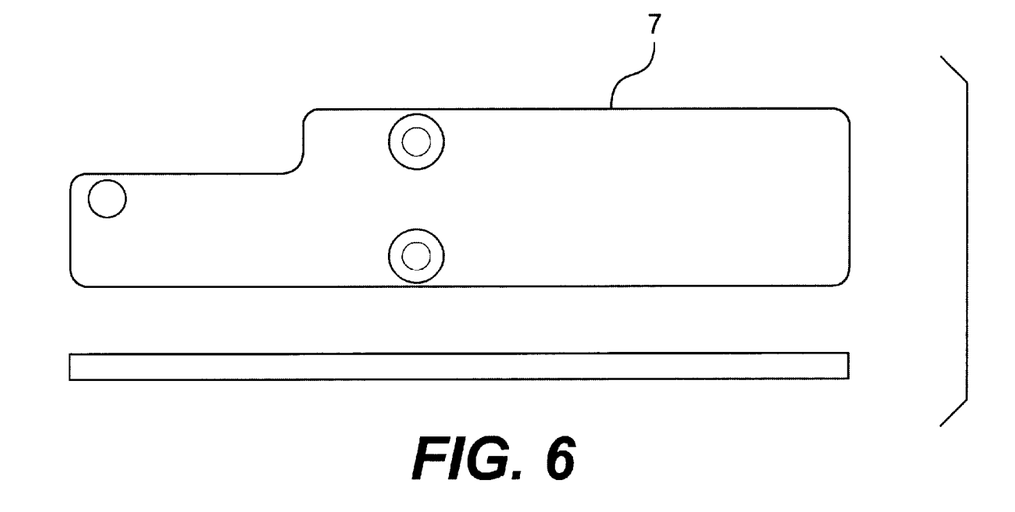
FIG. 6 shows a machine shop drawing of a typical side plate.

Referring to FIG. 6, the dimensions of a typical right hand side plate are 5 inches long and 1.25 inches wide. While the gauge is described in the header as black oxide, obviously it can be manufactured using any well known engineering method and material. Various other metals can be used. The gauge can be molded from a variety of plastics. It can be formed from a mixture of plastics and metals.

Figure 7:
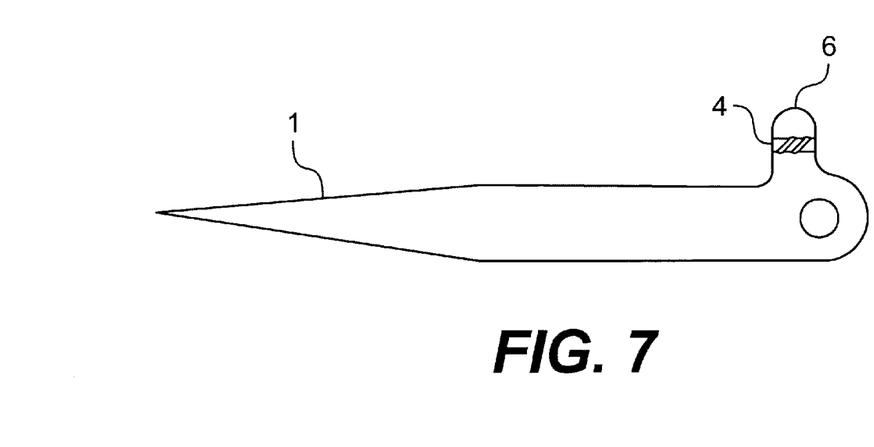
FIG. 7 shows a machine shop drawing of a typical pointed indicator.

Referring to FIG. 7, the pointed indicator measures 4 inches from the pointed tip to the center of the largest thru hole. The set screw hole is formed in the indicator foot with a long axis parallel to the indicator long axis.

Figure 8:
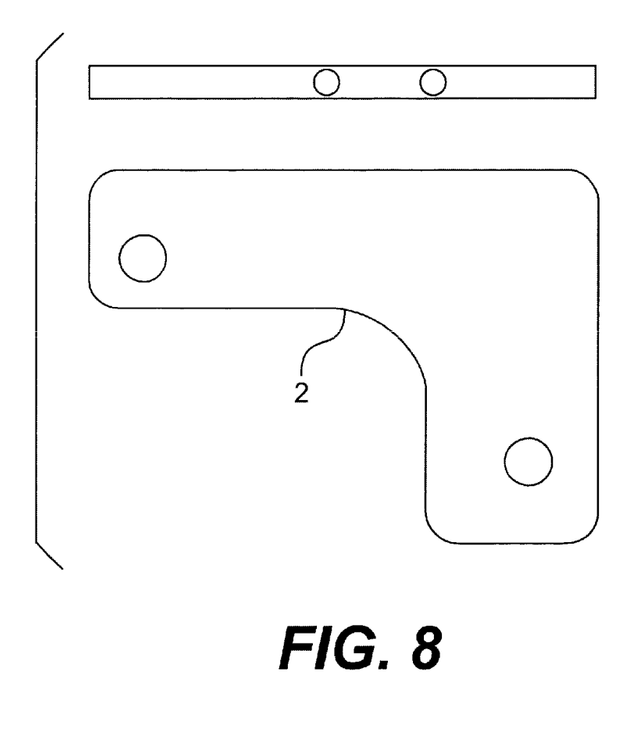
FIG. 8 shows a machine shop drawing of a typical stagger alignment plate.

Referring to FIG. 8, one form of a gauge alignment plate has staggered pins. Obviously a machinist skilled in the art could, with slight modifications, make a gauge to fit almost any starter motor.

Figure 9:
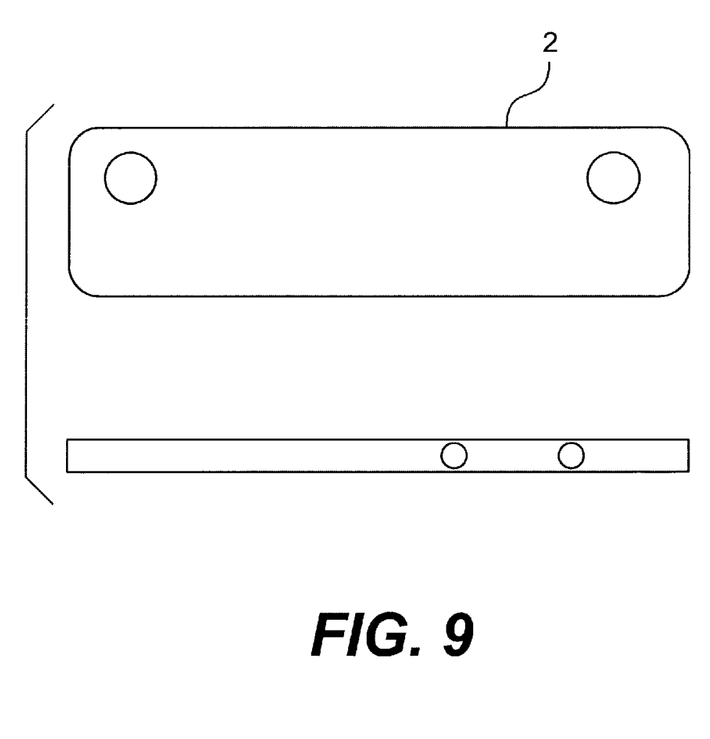
FIG. 9 shows a machine shop drawing of a straight alignment plate (right hand).

Referring to FIG. 9, a right hand straight alignment plate has two holes for attaching a side plate to the right side of the alignment plate.

Figure 10:
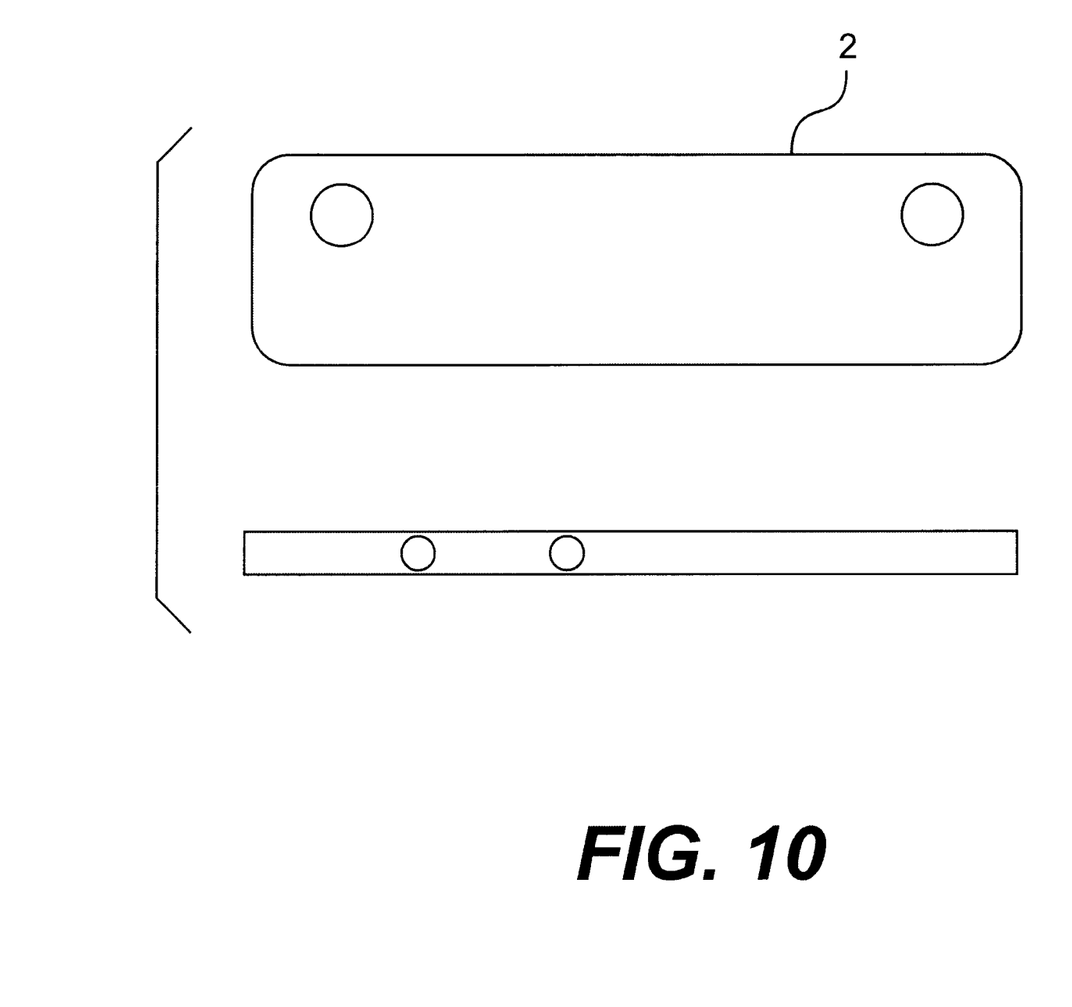
FIG. 10 shows a machine shop drawing of a straight alignment plate (left hand).

Referring to FIG. 10, a left hand straight alignment plate has two holes for mounting a side plate to the left side of the alignment plate.

To compare replacement starters with cores (old starters off of cars), place the gauge on the starter core by placing the pins into the mounting holes on the drive end housing. While the gauge is on the starter, hold the gauge firmly in place and move the pointer arm until the indicator foot touches the armature shaft. Read the gauge. Follow the same procedure with the replacement starter and compare the gauge readings to indicate if the replacement starter will mount properly. Both old and replacement starters should have the same reading.

For example, if the core reads 20 to the left (−), then the replacement should also read 20 to the left (−). If there is a difference to these measurements (core is −20 and the rebuilt starter reads −30) apply shims. If the difference indicates a + difference (to the right), select a different replacement starter.

Obviously the gauge can be used to check other starter dimensions. For instance, it can check to make sure the pinion to housing spacing relationship is correct. It can be used to check the housing to shaft location or the housing to gear location. In all instances, the gauge will not fit if these dimensions are not correct.

The gauge provides a fast and easy way to match the starter housing of a core to the housing on a replacement starter. The gauge is used on starters found on cars manufactured from the 1950's to present day.

Drive end housings have multiple mounting patterns, including staggered bolt, straight bolt pattern (left hand opening), and straight bolt pattern (right hand opening). Three gauges have been designed to mount on these specific applications.

The gauge can be used in the remanufacturing process. Various stands can be provided so that a remanufacturer can hold the drive end housing stationary in order to mount the gauge to identify comparable drive end housings. One stand consists of a square base plate having a recessed circular plate extending therefrom at about a 45 degree angle. The circular plate has a central shaft with a cylindrical end extending at right angles therefrom. The recess accepts a matching part of a drive end housing and the shaft cylindrical end runs through the drive end housing to a receiving socket in the housing. The gauge alignment plate is mounted on the drive end housing and the indicator is slowly moved until the foot of the indicator (set screw) touches against the stand shaft.

Figure 11:
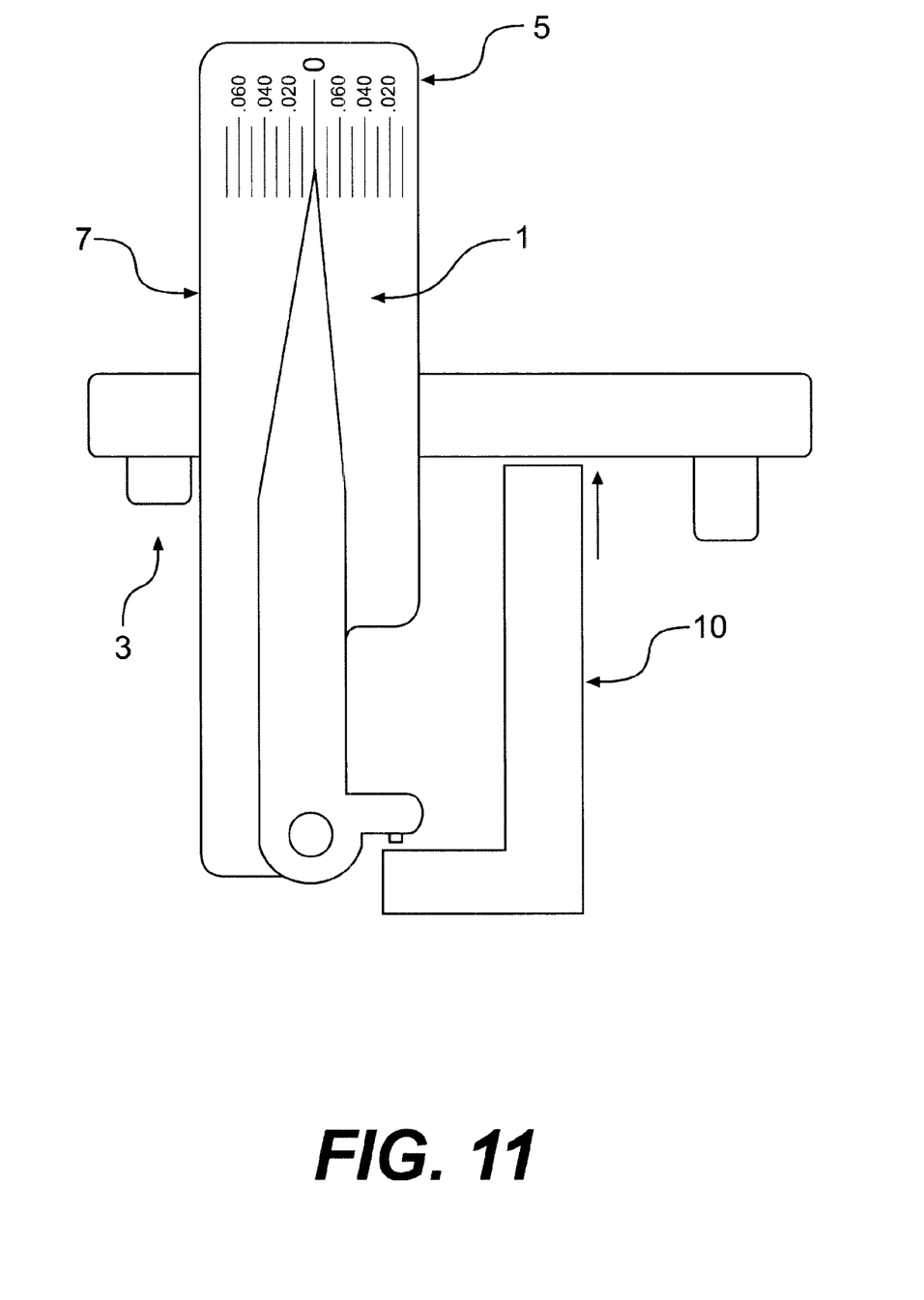
FIG. 11 is a top plan view of the gauge with a calibration gauge in place.

Referring to FIG. 11, to calibrate the gauge (staggered bolt model), a calibration tool (10) is hand-mounted perpendicularly against the bottom of the top of the flange, with pins (3) facing down. Move indicator until the Allen screw on the foot of the indicator makes complete contact. The gauge can then be calibrated to 0 (zero).

The preferred embodiments described are not to be considered restrictive, the scope of the invention being indicated by the appended claims. All changes coming with the meaning and range of equivalency of the claims are intended to be embraced therein.

I claim:

1. An integral gauge for measuring the distance between parts of a starter motor, consisting of:

a first means for mounting said gauge on a first part of the starter motor;

a second means for contacting a gauge part with a second part of the starter motor;

and scale means for reading said gauge;

wherein the said second means comprises an elongated pivoting indicator having two ends;

wherein said indicator has one pointed end for interacting with said scale;

wherein said indicator has another end for interacting with said second part of the starter motor;

wherein said another end has a foot extending perpendicular from the long axis of said indicator; and wherein said foot has a set screw therein with a longitudinal axis extending parallel to the longitudinal axis of said indicator.

2. A gauge for measuring the distance between automotive starter motor parts, comprising:

an alignment plate having means for interacting with a first part of said starter motor;

an indicator for interaction with a scale;

said indicator having a foot for interacting with a second part of said starter motor;

wherein said indicator is elongated and pivotable and has two ends, one end being pointed to interact with said scale and the other end having said foot thereon;

and wherein said foot extends perpendicular to the longitudinal axis of said indicator and has a set screw therein with the long axis of said set screw extending parallel to the said longitudinal axis of said indicator.

3. A method of measuring the distance between starter motor parts comprising:

mounting a gauge on a first part of the starter;

contacting a part of said gauge with a second part of the starter;

reading a scale on the said gauge;

wherein said scale is part of a side plate;

wherein said side plate has an elongated pivoting indicator mounted thereon, said indicator having two ends;

wherein one end of said indicator is pointed and traverses said scale and the other end has a foot for contacting said second part of said starter;

and wherein said foot has a set screw therein, and said gauge has been calibrated by interacting said screw with an L-shaped calibration tool.

* * * * *